(12) United States Patent
Aota et al.

(10) Patent No.: US 10,775,779 B2
(45) Date of Patent: Sep. 15, 2020

(54) OPERATION INFORMATION ANALYZER

(71) Applicant: MITSUBISHI HITACHI POWER SYSTEMS, LTD., Yokohama-shi, Kanagawa (JP)

(72) Inventors: Hiromi Aota, Tokyo (JP); Junya Iwasaki, Kanagawa (JP); Pradeepa Wevita, Kanagawa (JP); Takashi Sonoda, Tokyo (JP)

(73) Assignee: MITSUBISHI HITACHI POWER SYSTEMS, LTD., Yokohama-shi, Kanagawa (JP)

(*) Notice: Subject to any disclaimer, the term of this patent is extended or adjusted under 35 U.S.C. 154(b) by 0 days.

(21) Appl. No.: 16/306,193

(22) PCT Filed: Dec. 16, 2016

(86) PCT No.: PCT/JP2016/087503
§ 371 (c)(1),
(2) Date: Nov. 30, 2018

(87) PCT Pub. No.: WO2018/020703
PCT Pub. Date: Feb. 1, 2018

(65) Prior Publication Data
US 2019/0339680 A1     Nov. 7, 2019

(30) Foreign Application Priority Data
Jul. 27, 2016   (JP) .................................. 2016-146926

(51) Int. Cl.
*G05B 23/02*     (2006.01)
*G06F 16/23*     (2019.01)
(Continued)

(52) U.S. Cl.
CPC ..... *G05B 23/0216* (2013.01); *G05B 23/0286* (2013.01); *G06F 16/2358* (2019.01); *G06F 16/2477* (2019.01); *G06F 16/285* (2019.01)

(58) Field of Classification Search
None
See application file for complete search history.

(56) References Cited

U.S. PATENT DOCUMENTS

| 5,790,424 A | * | 8/1998 | Sugihara ................... G07C 3/00 |
| | | | 340/500 |
| 7,092,914 B1 | * | 8/2006 | Shear ................. G06Q 20/3674 |
| | | | 705/67 |

(Continued)

FOREIGN PATENT DOCUMENTS

| JP | 5-135185 A | 6/1993 |
| JP | 8-36682 A | 2/1996 |

(Continued)

OTHER PUBLICATIONS

English Translation of Written Opinion dated Mar. 7, 2017, issued in counterpart JP application No. PCT/JP2016/087503 (6 pages).

(Continued)

*Primary Examiner* — Ramesh B Patel
(74) *Attorney, Agent, or Firm* — Westerman, Hattori, Daniels & Adrian, LLP

(57) ABSTRACT

An operation information analyzer includes: an information collection unit 11 configured to collect event information on events that have occurred during operation of an apparatus 20 including a plurality of devices 21; an information analysis unit 12 configured to organize the collected event information to generate and store index values used to evaluate operation conditions of the apparatus 20; and an information presentation unit 13 configured to present the index values stored in the information analysis unit 12 to a user. The information analysis unit 12 generates the index (Continued)

values for each period sectioned based on a change in an operation state of the apparatus.

7 Claims, 12 Drawing Sheets

(51) Int. Cl.
  *G06F 16/28* (2019.01)
  *G06F 16/2458* (2019.01)

(56) References Cited

U.S. PATENT DOCUMENTS

| | | | |
|---|---|---|---|
| 9,158,604 B1* | 10/2015 | Christodorescu | G06F 9/54 |
| 9,378,183 B2* | 6/2016 | Tamaki | G05B 23/0224 |
| 2004/0073405 A1 | 4/2004 | Karasawa | |
| 2004/0073468 A1 | 4/2004 | Vyas et al. | |
| 2005/0114089 A1 | 5/2005 | Celestini | |
| 2007/0179751 A1 | 8/2007 | Karasawa | |
| 2013/0132000 A1 | 5/2013 | Tamaki | |
| 2015/0356462 A1* | 12/2015 | Fawaz | G06N 5/043 |
| | | | 706/12 |
| 2016/0078362 A1* | 3/2016 | Christodorescu | G06F 21/566 |
| | | | 706/12 |
| 2016/0103996 A1* | 4/2016 | Salajegheh | G06F 11/3024 |
| | | | 726/25 |
| 2016/0217029 A1* | 7/2016 | Yoon | G06F 11/3612 |
| 2016/0337390 A1* | 11/2016 | Sridhara | G06F 3/0484 |
| 2017/0046510 A1* | 2/2017 | Chen | G06F 21/552 |
| 2018/0335770 A1* | 11/2018 | Uemura | G06Q 10/0639 |

FOREIGN PATENT DOCUMENTS

| | | |
|---|---|---|
| JP | 10-124221 A | 5/1998 |
| JP | 11-161318 A | 6/1999 |
| JP | 2001-45641 A | 3/2001 |
| JP | 2003-271233 A | 9/2003 |
| JP | 2003-271238 A | 9/2003 |
| JP | 2010-44780 A | 2/2010 |
| JP | 2010-49532 A | 3/2010 |
| JP | 2011-243118 A | 12/2011 |
| JP | 2012-8782 A | 1/2012 |
| TW | 576959 B | 2/2004 |

OTHER PUBLICATIONS

English Translation of Notification of Reasons for Refusal dated Mar. 27, 2018, issued in counterpart TW application No. 106102990 (6 pages).
English Translation of Notification of Reasons for Refusal dated Aug. 31, 2018, issued in counterpart TW application No. 106102990 (5 pages).
Notification of Reasons for Refusal dated Jun. 12, 2018, issued in counterpart Japanese Patent Application No. 2016-146926, w/English translation (10 pages).
Decision to Grant a Patent dated Jul. 10, 2018, issued in counterpart Japanese Patent Application No. 2016-146926, w/English translation (6 pages).
International Search Report dated Mar. 7, 2017, issued in counterpart application No. PCT/JP2016/087503 (2 pages).
Written Opinion in Japanese dated Mar. 7, 2017, issued in counterpart application No. PCT/JP2016/087503 (4 pages).
Notification of Reasons for Refusal dated Mar. 27, 2018, issued in counterpart Taiwanese application No. 106102990 (6 pages).
Notification of Reasons for Refusal dated Aug. 31, 2018, issued in counterpart Taiwanese application No. 106102990 (4 pages).
Office Action dated Dec. 12, 2019, issued in counterpart Philippine application No. 1-2018-502503 (4 pages).

* cited by examiner

FIG.2

| Time | Tag | Message | Status | Group | Code | Level |
|---|---|---|---|---|---|---|
| 2016/5/3 3:20 | 3TSTM… | LP TURBINE EXHAUST HOOD TEMP HIGH | 1 | 3 | 82 | 2 |
| 2016/5/3 3:23 | 3BFUE… | BURNER HEADER FUEL GAS PRESS LOW | 2 | 3 | 82 | 2 |
| 2016/5/3 3:23 | 3BFUE… | BURNER HEADER FUEL GAS PRESS LOW | 2 | 3 | 82 | 2 |
| 2016/5/3 3:28 | 3TEHA… | CONDENSER VACUUM LOW | 2 | 3 | 82 | 2 |
| 2016/5/3 3:28 | 3TSTM… | LP TURBINE EXHAUST HOOD TEMP HIGH | 2 | 3 | 82 | 2 |
| 2016/5/3 3:36 | 3BBOI… | DRUM LEVEL HIGH | 1 | 3 | 82 | 2 |
| 2016/5/3 3:38 | 3TEHA… | CONDENSER VACUUM LOW | 2 | 3 | 82 | 2 |
| 2016/5/3 3:39 | 3BBOI… | DRUM LEVEL HIGH | 2 | 3 | 82 | 2 |
| 2016/5/3 3:40 | 3BBOI… | DRUM LEVEL HIGH | 1 | 3 | 82 | 2 |
| ⋮ | ⋮ | ⋮ | ⋮ | ⋮ | ⋮ | ⋮ |

FIG.5

| Time | Tag | Message |
|---|---|---|
| 2016/5/7 0:00 | 3BF3D⋯ | AC LUBRICATION OIL PUMP-B FOR RAH-A OFF |
| 2016/5/7 0:04 | 3BF3D⋯ | RAH SOOTBLOWER DRAIN VALVE-A CLOSE |
| 2016/5/7 0:04 | 3BF3D⋯ | SOOTBLOWER DRAIN VALVE-A CLOSE |
| 2016/5/7 0:04 | 3BF3D⋯ | SOOTBLOWER DRAIN VALVE-A CLOSE |
| 2016/5/7 0:04 | 3BF3D⋯ | RAH SOOTBLOWER DRAIN VALVE-A CLOSE |
| 2016/5/7 0:04 | 3BF3D⋯ | SOOTBLOWER 5L RETRACT POSITION RESET |
| 2016/5/7 0:04 | 3BF3D⋯ | SOOTBLOWER 5L INSERT POSITION ON |
| ⋮ | ⋮ | ⋮ |

FIG.6

| 2016/5/7 | | | |
|---|---|---|---|
| Message | DATA COUNT 1 | DATA COUNT 2 | TOTAL |
| 3BA1D⋯ | 759 | 759 | 1518 |
| SECONDAY DESUPERHEATER SPRAY CV-B FULL CLOSE | 759 | | 759 |
| SECONDAY DESUPERHEATER SPRAY CV-B OPEN | | 759 | 759 |
| 3BA1D⋯ | 690 | | 690 |
| ECO OUTLET FLUE GAS O2 SELECT RIGHT | 690 | | 690 |
| 3BA1D⋯ | 690 | | 690 |
| ECO OUTLET FLUE GAS O2 SELECT LEFT | 690 | | 690 |
| 3BA1D⋯ | 276 | | 276 |
| LP2 HEATER LEVEL CV CLOSE ON | 276 | | 276 |
| ⋮ | ⋮ | ⋮ | ⋮ |

FIG.7

| Tag | Message | DATA COUNT 1 | DATA COUNT 2 | TIME | | |
|---|---|---|---|---|---|---|
| 3BA1D··· | SECONDARY DESUPERHEATER SPRAY CV-A FULL CLOSE | 7424 | 7424 | 2016/5/1 6:53 | 2016/5/1 6:53 | ··· |
| 3BA1D··· | SECONDARY DESUPERHEATER SPRAY CV-B FULL CLOSE | 8875 | 8876 | over 16380 counts | | |
| 3BF2D··· | SECONDARY SHR DSH SPRAY WATER STOP VALVE OPEN | 2 | | 2016/5/12 12:56 | 2016/5/12 1:09 | |
| 3BF2D··· | SECONDARY SHR DSH SPRAY WATER STOP VALVE CLOSE | 2 | | 2016/5/12 12:55 | 2016/5/12 1:06 | |
| ⋮ | ⋮ | ⋮ | ⋮ | | | |
| TOTAL | | 16324 | 16300 | | | |

FIG.8

| Tag | Message | DATA COUNT 1 | DATA COUNT 2 | COUNTED ON-TIME |
|---|---|---|---|---|
| 3BA1D··· | SECONDARY DESUPERHEATER SPRAY CV-A FULL CLOSE | 7424 | 7424 | 59:56:25 |
| 3BA1D··· | SECONDARY DESUPERHEATER SPRAY CV-B FULL CLOSE | 8875 | 8876 | ⋮ |
| 3BF2D··· | SECONDARY SHR DSH SPRAY WATER STOP VALVE OPEN | 2 | | ⋮ |
| 3BF2D··· | SECONDARY SHR DSH SPRAY WATER STOP VALVE CLOSE | 2 | | ⋮ |
| ⋮ | ⋮ | ⋮ | ⋮ | ⋮ |
| TOTAL | | 16324 | 16300 | |

FIG.9

| | START 5/1 - 5/3 | STOP/START 5/17·5/18 | NORMAL OPERATION MAY (26 DAYS) | NORMAL OPERATION JUNE (30 DAYS) | NORMAL OPERATION JULY (31 DAYS) | NORMAL OPERATION AUGUST (16 DAYS) |
|---|---|---|---|---|---|---|
| WARNING TOP 30 TYPES | OCCURRED 129 RECOVERED 139 (TOTAL 268) | OCCURRED 112 RECOVERED 112 (TOTAL 224) | OCCURRED 104 RECOVERED 110 (TOTAL 214) | OCCURRED 17 RECOVERED 15 (TOTAL 32) | OCCURRED 19 RECOVERED 21 (TOTAL 40) | OCCURRED 30 RECOVERED 28 (TOTAL 58) |
| START AND STOP TOP 30 TYPES | ON 2145 OFF 1291 (TOTAL 3436) | ON 2558 OFF 1205 (TOTAL 6802) | ON 31382 OFF 14216 (TOTAL 57790)* | (TOTAL 104042)* | (TOTAL 92945)* | ON 31925 OFF 7231 (TOTAL 46848)* |
| OPERATION MANIPULATION TOP 30 TYPES | 470 (TOTAL 651) | 732 (TOTAL 814) | 2677 (TOTAL 2804) | 1692 (TOTAL 1694) | 2144 (TOTAL 2165) | 1396 (TOTAL 1396) |
| ADJUSTMENT MANIPULATION | 8 | 1 | 45 | 38 | 12 | 19 |
| SYSTEM WARNING | OCCURRED 110 RECOVERED 96 | OCCURRED 27 RECOVERED 28 | OCCURRED 9 RECOVERED 12 | OCCURRED 22 RECOVERED 20 | NONE | OCCURRED 9 RECOVERED 4 |
| REMARKS | | | *O2 GAUGE SWITCH 5000 TIMES | *O2 GAUGE SWITCH 25000 TIMES, DSH OPENING/ CLOSING 15000 TIMES | *O2 GAUGE SWITCH 20000 TIMES, DSH OPENING/ CLOSING 15000 TIMES | *THERE ARE 7 TYPES OF ON/OFF OF 1000 TIMES OR MORE |

FIG.13

| EVENT INFORMATION | RELATED PROCESS AMOUNT |
|---|---|
| 3BA1D···"1RYDSH SPRAY CV-B MANUAL&OPERATE" | PRIMAY DSH OUT STEAM TEMP(L) |
| | PRIMAY DSH OUT STEAM TEMP(R) |
| | PRIMAY SH OUT STEAM TEMP(L) |
| | PRIMAY SH OUT STEAM TEMP(R) |
| | SECY SH OUT STEAM TEMP(L) |
| | SECY SH OUT STEAM TEMP(R) |
| 3BF2D···"SECONDARY SHR DSH SPRAY WATER STOP VALVE CLOSE" | SECY DSH OUT STEAM TEMP(L) |
| | SECY DSH OUT STEAM TEMP(R) |
| | SECY SH OUT STEAM TEMP(L) |
| | SECY SH OUT STEAM TEMP(R) |
| | FINAL SH OUT STEAM TEMP(L) |
| | FINAL SH OUT STEAM TEMP(R) |

OPERATION INFORMATION ANALYZER

FIELD

The present invention relates to an operation information analyzer.

BACKGROUND

Technology of collecting various kinds of information on operation of apparatuses and analyzing the collected information to evaluate operation conditions of the apparatuses has been conventionally known. For example, Patent Literature 1 discloses an operation condition analysis system configured to analyze operation conditions of apparatuses connected to a distributed field control system, the operation condition analysis system collecting information on control states of the apparatus or manipulation to the apparatus, calculating index values for the degree of utilization of the apparatus based on the information, and making comparative analysis of the degree of utilization of the apparatus among a plurality of sites based on the index values.

CITATION LIST

Patent Literature

Patent Literature 1: Japanese Unexamined Patent Application Publication No. 2010-44780

SUMMARY

Technical Problem

In the operation condition analysis system in Patent Literature 1, for example, an integrated value of shift amounts of a control value from a setting value at daily intervals and a total time during which a specific control value is controlled by automatic control in a day are used as index values, and the index values are compared among similar apparatuses in other sites to make comparative analysis of the degree of utilization of the apparatus. However, for example, when a change in operation state, such as a change in operation load of a device included in an apparatus or a change in the type of fuel used in the device, occurs, the occurrence conditions of process amounts and event information in an apparatus to be monitored also change. Thus, analyzing the index values while being simply sectioned by unit time, such as one day, as in the operation condition analysis system in Patent Literature 1 cannot accurately evaluate operation conditions of the apparatus in some cases.

The present invention has been made in view of the above, and it is an object thereof to provide an operation information analyzer capable of evaluating operation conditions of an apparatus more accurately.

Solution to Problem

To solve the problem described above and achieve the object, the present invention includes an information collection unit configured to collect event information on events that have occurred during operation of an apparatus including a plurality of devices; an information analysis unit configured to organize the collected event information to generate and store index values used to evaluate operation conditions of the apparatus; and an information presentation unit configured to present the index values stored in the information analysis unit to a user. The information analysis unit is configured to generate the index values for each period sectioned based on a change in an operation state of the apparatus.

The operation information analyzer in the present invention organizes event information on events that have occurred during operation of an apparatus, generates and stores index values used to evaluate operation conditions of the apparatus, and presents the stored index values to a user for each period sectioned based on a change in the operation state of the apparatus. In this manner, the user can check the index values of the apparatus generated and presented while sectioned each time the operation state of the apparatus changes. Consequently, the operation information analyzer in the present invention enables the operation conditions of the apparatus to be more accurately evaluated.

Further, the change in the operation state is preferably a change in load of any of the devices. Consequently, the index values can be more accurately evaluated in accordance with the change in load of any of the devices.

Further, the change in the operation state is preferably a change in type of fuel used in any of the devices. Consequently, the index values can be more accurately evaluated in accordance with the change in the type of fuel used in any of the devices.

Further, it is preferable that the event information includes information on warning of the apparatus, information on manipulation of the devices, information on an operation state of the devices, and information on warning of the operation information analyzer, the information analysis unit classifies the event information into types of the event information to generate and store the index values, and the information presentation unit presents the index values classified into types of the event information to the user. In this manner, by presenting the index values to the user while classifying the index values for each event information related to the apparatus, such as warning, device manipulation, and the operation state of the device, the user can easily evaluate operation conditions of the apparatus.

Further, it is preferable that the information analysis unit generates and stores the index values while classifying the index values into types of the devices, and the information presentation unit presents the index values classified into types of the devices to the user. In this manner, by presenting the index values to the user while classifying the index values for each device included in the apparatus, the user can easily evaluate operation conditions of the apparatus.

Further, the information presentation unit preferably presents the index values for each period freely sectioned by the user. Consequently, only index values in a period that the user wants to check can be presented, and hence the user can easily evaluate operation conditions of the apparatus.

Further, it is preferable that the information collection unit collects process amounts of the apparatus, the information analysis unit generates and stores data in which the event information and behavior of the process amount related to the event information are associated with each other, and the information presentation unit presents the data stored in the information analysis unit to the user. Consequently, for example, the user can easily grasp the behavior of related process amounts when an event such as warning has occurred. As a result, the cause of the occurrence of the event can be more efficiently analyzed.

Further, it is preferable that when any of the devices is updated or repaired, the information analysis unit temporarily stops storing the index values related to the updated or repaired device, and newly generates and stores index values. Consequently, the comparison of effects indicating how operation conditions of the apparatus are influenced due to the update or repair of the device can be easily made to easily evaluate relative merits before and after the device is updated or repaired.

Further, it is preferable that when any of the devices is updated or repaired, the information analysis unit temporarily stops storing the data related to the updated or repaired device, and newly generates and stores the data. Consequently, the change in behavior of related process amounts upon the occurrence of an event can be compared before and after a device is updated or repaired. Thus, the cause of the occurrence of the event can be still more efficiently analyzed.

Advantageous Effects of Invention

The operation information analyzer according to the present invention exhibits an effect that operation conditions of an apparatus can be more accurately evaluated.

BRIEF DESCRIPTION OF DRAWINGS

FIG. 2 is an explanation diagram illustrating an example of event information acquired by an information collection unit.
FIG. 5 is an explanation diagram illustrating an example of analysis results presented by an information presentation unit.
FIG. 6 is an explanation diagram illustrating an example of analysis results presented by the information presentation unit.
FIG. 7 is an explanation diagram illustrating an example of analysis results presented by the information presentation unit.
FIG. 8 is an explanation diagram illustrating an example of analysis results presented by the information presentation unit.
FIG. 9 is an explanation diagram illustrating an example of analysis results presented by the information presentation unit.
FIG. 13 is an explanation diagram illustrating an example of a correspondence relation between event information and process amounts related to the event information.

DESCRIPTION OF EMBODIMENTS

Embodiments of an operation information analyzer according to the present invention are described in detail below with reference to the drawings. Note that the present invention is not limited by the embodiments.

First Embodiment

Figure 1:
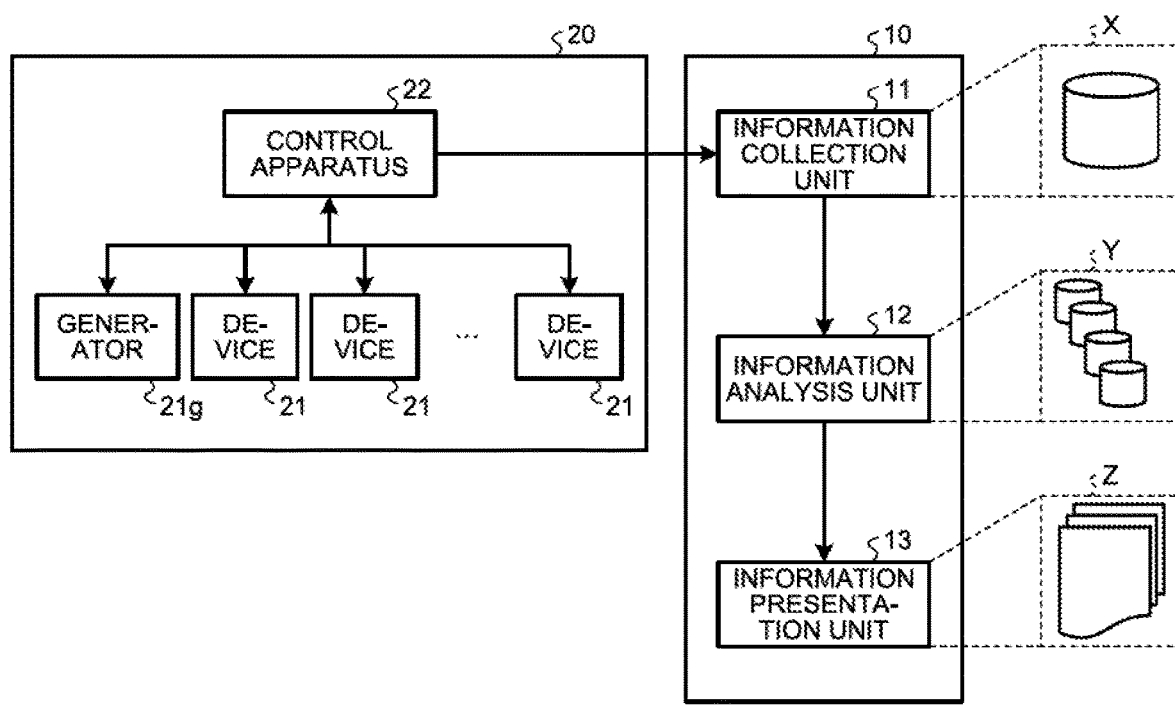
FIG. 1 is a block diagram illustrating an operation information analyzer according to a first embodiment.

FIG. 1 is a block diagram illustrating an operation information analyzer according to a first embodiment. An operation information analyzer 10 is a system configured to analyze operation conditions of an apparatus 20, such as a power plant, and present analysis results to users. Examples of the users include manufacturers or sellers of the apparatus 20 and operators who actually operate the apparatus 20. The apparatus 20 includes a plurality of devices 21 including a generator 21g, and a control apparatus 22 configured to control the devices 21. Examples of the devices 21 include devices configured to drive the generator 21g (for example, a gas turbine and a steam turbine), pumps, fans, and various kinds of valve facilities. The control apparatus 22 controls process amounts P of these devices 21. The control apparatus 22 functions also as a storage unit configured to store therein various kinds of event information that occur during the operation of the apparatus 20.

The operation information analyzer 10 includes an information collection unit 11 configured to communicate to the control apparatus 22 to collect event information X on the apparatus 20, an information analysis unit 12 configured to organize the event information X on the apparatus 20 acquired by the information collection unit 11 to generate and store databases Y of a plurality of index values used to evaluate operation conditions of the apparatus 20, and an information presentation unit 13 configured to present the databases Y of the index values generated by the information analysis unit 12 to the users as analysis results Z.

The information collection unit 11 can communicate to the control apparatus 22 through a network, and automatically acquires and stores therein event information X on the apparatus 20 from the control apparatus 22 for every predetermined period (for example, hourly or daily). Note that the information collection unit 11 may manually acquire the event information X on the apparatus 20 stored in the control apparatus 22 by the user through a storage medium such as a DVD-ROM.

Figure 4:
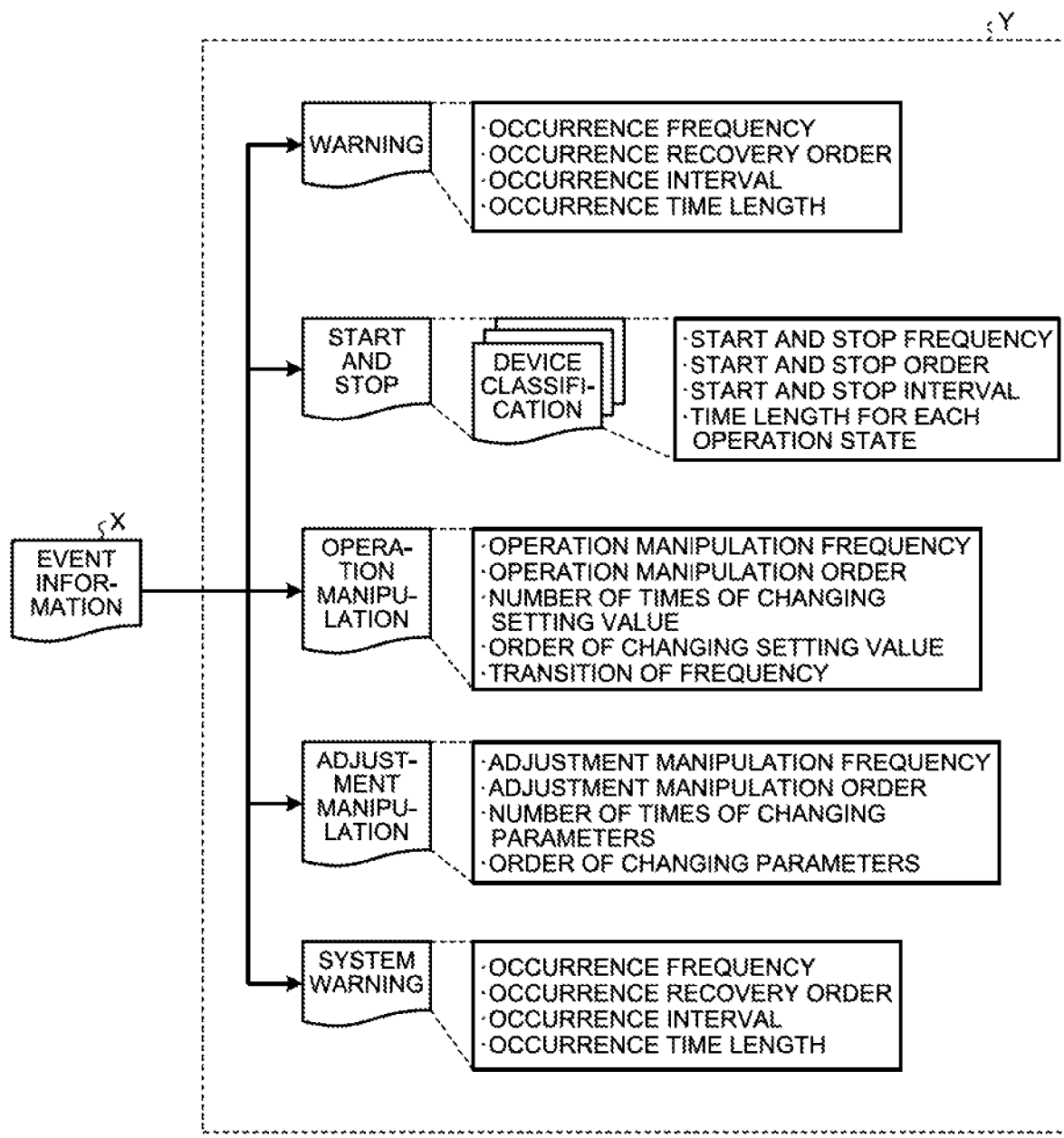
FIG. 4 is an explanation diagram illustrating an example of databases of index values generated by an information analysis unit.

The event information X that occurs during the operation of the apparatus 20 includes information on warning that occurred in each device 21 in the apparatus 20, information on operation states of each device 21, and information on manipulation of each device 21 (see FIG. 4). The information on manipulation of each device 21 includes information on operation manipulation of each device 21 and information on adjustment manipulation of each device 21. The event information X includes information on system warning that occurred in the operation information analyzer 10.

The information on warning that occurred in each device 21 includes information on warning about failure and abnormality in each device 21 and warning issued when a process amount P in each device 21 has exceeded a control management value. In the first embodiment, the case where warning is issued is defined as "occurrence", and the case where warning is stopped is defined as "recovery".

The information on the operation states of each device 21 includes information on start and stop operations of each device 21 and information indicating which operation mode the device 21 is operating in when the device 21 has a plurality of operation modes. The start and stop operations of each device 21 mean that a start instruction or a stop instruction has been performed when the device 21 is, for example, a pump, a fan, or a motor, and mean that a valve opening instruction or a valve closing instruction has been performed when the device 21 is a valve facility. In the first embodiment, the case where one of the start and stop operations (start instruction or stop instruction, or opening instruction or closing instruction) is performed is defined as "on", and the case where the other is performed is defined as "off" for each device 21.

The information on the operation manipulation of each device 21 includes information on some manipulation instruction other than the start and stop and the change of the operation mode performed on each device 21. Examples of the operation manipulation of each device 21 include manipulation of changing control setting values related to process amounts P, such as the flow rate, pressure, and temperature as operation targets, for each device 21. The operation manipulation of each device 21 is mainly performed by operators. The information on the adjustment manipulation of each device 21 includes information on manipulation instructions involving control logic of each device 21. Examples of the adjustment manipulation of each device 21 include manipulation of changing control parameter values of each device 21, such as a setting value of response speed and a setting value of a gain to an input value and a detection value during control. The adjustment manipulation of each device 21 is mainly performed by maintenance workers.

Examples of the information on system warning that occurred in the operation information analyzer 10 include information on warning issued when communications between the control apparatus 22 and the information collection unit 11 have been interrupted and when some abnormality has occurred in the operation information analyzer 10.

FIG. 2 is an explanation diagram illustrating an example of event information X acquired by the information collection unit 11. As illustrated in FIG. 2, the event information X includes information on a time when an event occurred, a preset type code of a device 21 in which the event occurred, a message as a specific content of the event, and other information on the event (for example, information on a plant hierarchy to which a corresponding device 21 belongs). Note that FIG. 2 illustrates a specific content of warning that occurred in the device 21 as an example of the message.

The information analysis unit 12 acquires the event information X from the information collection unit 11, and generates and stores a database Y of index values for each period sectioned based on the operation state of the apparatus 20. In the first embodiment, a change in the operation state of the apparatus 20 is a change in operation load of the generator 21*g* or a change in the type of fuel used in a device 21 (for example, a gas turbine or a steam turbine) configured to drive the generator 21*g*.

The operation load of the generator 21*g* changes depending on the state of the generator 21*g*, such as a start process, a rated operation process, a partial load operation process, a minimum load operation process, a stop process, and a stopped state of the generator 21*g*. Examples of the start process include a process during which the generator 21*g* is operated with an output of 35% or less of the rated load without output fluctuation until a predetermined time elapses. Examples of the rated operation process include a process during which the generator 21*g* is operated with an output of 90% or more of the rated load. Examples of the partial load operation process include a process during which the generator 21*g* is operated with an output of 40% or more and less than 90% of the rated load. Examples of the minimum load operation process include a process during which the generator 21*g* is operated with an output of less than 40% of the rated load. The stop process is a process from when the generator 21*g* is operated with an output of 5% or more and less than 35% of the rated load to when the operation of the generator 21*g* is stopped. The stopped state is a state in which the operation of the generator 21*g* is stopped.

Figure 3:
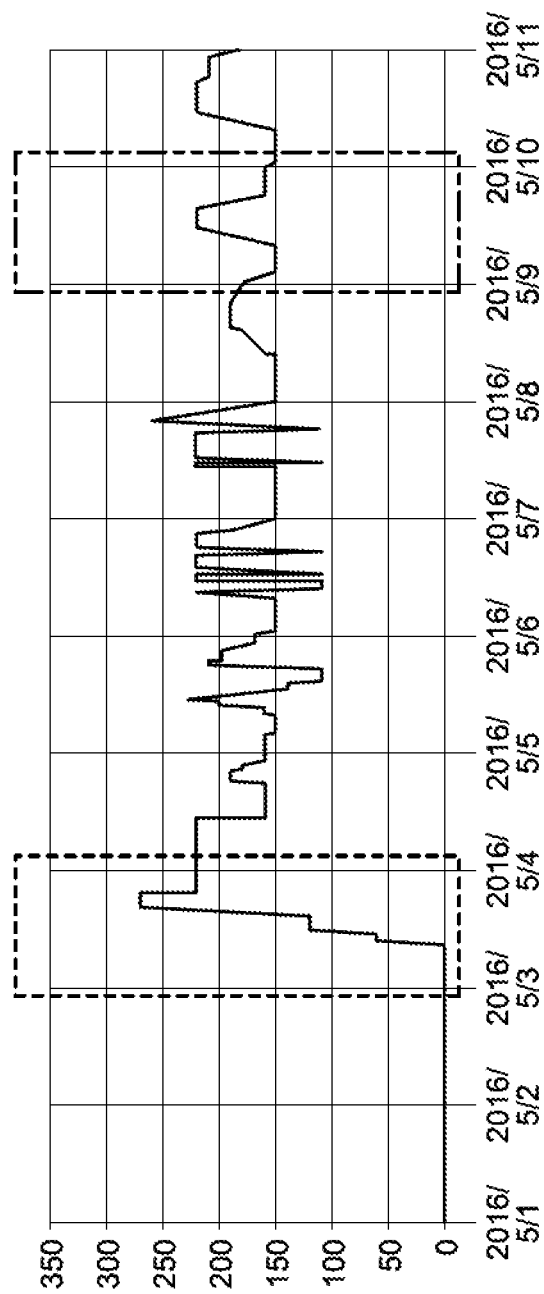
FIG. 3 is an explanation diagram illustrating a change in load of a generator with a lapse of time.

FIG. 3 is an explanation diagram illustrating a change in load of the generator 21*g* with a lapse of time. The horizontal axis in FIG. 3 is the date, and the vertical axis is the load of the generator 21*g*. The range surrounded by the broken line in FIG. 3 is a period of the start process of the generator 21*g*, and the range surrounded by the two-dot chain line is a period of the normal operation process (any one of the rated operation process, the partial load operation process, and the minimum load operation process) of the generator 21*g*. As illustrated in FIG. 3, the load of the generator 21*g* differs depending on the process, and if there is such a change in operation load of the generator 21*g* or a change in the type of fuel used in a device 21 for driving the generator 21*g*, the tendency of various kinds of events occurring in the apparatus 20 is likely to change. Thus, by sectioning a period for generating a database Y of index values depending on the change in operation load of the generator 21*g* or the change in the type of fuel in use, operation conditions of the apparatus 20 can be more accurately evaluated based on the index values.

FIG. 4 is an explanation diagram illustrating an example of a database Y of index values generated by the information analysis unit 12. The database Y of index values is generated while the index values are classified into types of event information X. As described above, the type of event information X includes information on warning that occurred in each device 21 in the apparatus 20, information on operation states of each device 21, information on operation manipulation of each device 21, information on adjustment manipulation of each device 21, and information on system warning that occurred in the operation information analyzer 10. Note that the classification depending on the type of event information X is not limited thereto.

The information analysis unit 12 generates a database Y of index values while classifying the index values into types of the respective devices 21. In the first embodiment, the information analysis unit 12 generates a database Y of index values that are classified into types of the respective devices 21 for information on the operation state of each device 21. For example, the information analysis unit 12 generates a database Y of index values for information on the operation state of the device 21 while classifying the index values for pumps, fans, and valve facilities included in the apparatus 20. Note that the information analysis unit 12 may also generate a database Y of index values while classifying the index values into types of the respective devices 21 for information on warning, information on operation manipulation, and information on adjustment manipulation.

Next, specific contents of the index values are described. As index values related to warning in a device 21, the information analysis unit 12 generates a database Y of the occurrence frequency (the total number of occurrences) of the warning, the order of the occurrence of warning and recovery in time series, the occurrence interval of warning, and the occurrence time length of warning. The information analysis unit 12 generates a database Y of the occurrence frequency (the total number of occurrences) of warning in which the top 30 types of cases in descending order of occurrence frequency are extracted.

The information analysis unit 12 generates, as index values related to operation states of devices 21, a database Y of the start and stop frequency (the total number of start and stop operations) in each device 21, the order of start and stop of each device 21 in time series, the intervals of start and stop of each device 21, and the time length for each operation state (on state, off state, or operation state in each operation mode) of each device 21. The information analysis unit 12 generates a database Y of the start and stop frequency (the total number of start and stop operations) of each device 21 in which the top 30 types of cases in descending order of start and stop frequency are extracted.

The information analysis unit 12 generates, as index values related to operation manipulation of devices 21, a database Y of the frequency of operation manipulation on the device 21 (the total number of operation manipulation instructions), the order of operation manipulation on the devices 21 in time series, the number of times of changing control setting values related to process amounts P in the devices 21, the order of changing the setting values in time series, and the transition of the operation manipulation frequency. The information analysis unit 12 generates a database Y of the operation manipulation frequency (the total number of manipulation instructions) in which the top 30 types of cases in descending order of operation manipulation frequency are extracted.

The information analysis unit 12 generates, as index values related to adjustment manipulation of devices 21, a database Y of the frequency of adjustment manipulation on the device 21 (the total number of manipulation instructions), the order of adjustment manipulation on the devices 21 in time series, the number of times of changing control parameters of the devices 21, and the order of chancing the parameters in time series.

The information analysis unit 12 generates, as index values related to system warning that occurred in the operation information analyzer 10, a database Y of the occurrence frequency (the total number of occurrences) of warning, the order of occurrence of warning and recovery in time series, the occurrence intervals of warning, and the occurrence time length of warning.

The information presentation unit 13 converts the database Y of the index values acquired from the information analysis unit 12 into data that can be used by a spreadsheet application in an externally connected personal computer (not shown), and transmits the converted data to the personal computer as analysis results Z of the operation conditions of the apparatus 20. The user can view the analysis results Z through the personal computer. Note that the operation information analyzer 10 may have a monitor configured to display the analysis results Z, and the information presentation unit 13 may display the analysis results Z on the monitor.

In the first embodiment, the information presentation unit 13 presents a database Y of index values for each period freely sectioned by a user, for each type of event information X freely selected by the user, or for each type of the device 21 freely selected by the user as the analysis result Z. In the first embodiment, the information presentation unit 13 presents a part of the database Y of the index values corresponding to a request from the user as analysis results Z. Examples of the analysis results Z presented by the information presentation unit 13 are described below.

FIG. 5 to FIG. 11 are explanation diagrams illustrating examples of analysis results Z presented by the information presentation unit 13. The example of the analysis results Z in FIG. 5 indicates the start and stop order in time series for each type of a device 21 freely selected by the user. The field of "Time" indicates the date and time at which a device 21 was started or stopped, the field of "Tag" indicates the type code of the device 21, and the field of "Messege" indicates the name of each device 21 and specific contents of the start and stop operations (start instruction or stop instruction, or opening instruction or closing instruction for valve facility). In this manner, the user can easily grasp the timing and the order of start and stop of each device 21 in time series for each type of the device 21.

The example of analysis results Z in FIG. 6 indicates the top 30 types of start and stop frequency of devices 21 in a period freely sectioned by a user. For example, the freely sectioned period can be selected by the user from "hourly", "daily", "weekly", "monthly", "half year" and "year". In the example illustrated in FIG. 6, "May 7, 2016" is a target period. The field of "Messege" indicates the type code of the device 21, the name of the device 21, and specific contents of the start and stop operations. The field of "data count 1" indicates the number of times of start and stop operations corresponding to "on" defined for the device 21, the field of "data count 2" indicates the number of times of start and stop operations corresponding to "off" defined for the device 21, and the field of "total" indicates the total number of "on" and "off". In this manner, the user can easily grasp which of the devices 21 has performed the start and stop operations most frequently in a period freely designated by the user.

The example of analysis results Z in FIG. 7 indicates the start and stop frequency for each device 21 freely selected by the user in a period freely sectioned by the user (for example, 1 month of May, 2016). In FIG. 7, the field of "Tag" indicates the type code of a specific device 21, the field of "Message" indicates the name of the device 21 and contents of the start and stop information, the field of "data count 1" indicates the number of times of start and stop operations corresponding to "on" defined for the device 21, the field of "data count 2" indicates the number of times of start and stop operations corresponding to "off" defined for the device 21, and the field of "time" indicates time at which the device 21 was started or stopped. For example, by displaying the start and stop operations corresponding to "on" and the start and stop operations corresponding to "off" in the field of "time" in different character colors, the user can easily grasp a timing at which a device 21 freely selected by the user was started or stopped in a period freely sectioned by the user while grasping the overall start and stop frequency.

Similarly to FIG. 7, the example of analysis results Z in FIG. 8 also indicates the start and stop frequency for each device 21 freely selected by a user in a period freely selected by the user (for example, 1 month of May, 2016). In FIG. 8, the fields of "Tag", "Message", "data count 1", and "data count 2" are the same as the fields in FIG. 7. In FIG. 7, the field of "counted on-time" indicates a total time of the start and stop operations corresponding to "on" defined for each device 21. In this manner, the user can easily grasp the total time during which the start and stop operations of a device 21 freely selected by the user has been performed in a period freely sectioned by the user while grasping the overall start and stop frequency.

In the examples in FIG. 6 to FIG. 8, the analysis results Z related to the start and stop frequencies of devices 21 in a period freely sectioned by a user are exemplified, but the period may be sectioned in accordance with the change in the operation state of the apparatus 20. For example, regarding the start process of the generator 21g surrounded by the broken line and the rated operation process of the generator 21g surrounded by the two-dot chain line in FIG. 3, the top 30 types of start and stop frequency of devices 21, and the start and stop frequency, the time of start and stop operations, and the total time during which the start and stop operations corresponding to "on" have been performed for each device 21 freely selected by the user may be presented similarly to FIG. 6 to FIG. 8. In this manner, the user can easily grasp what kind of start and stop operations of the device 21 occurred in each process.

The example of analysis results Z in FIG. 9 indicates the occurrence frequencies of event information X for each type of the event information X in periods sectioned based on a change in the operation state of the apparatus 20 and in periods freely sectioned by the user. The periods are sectioned into a start process (from May 1 to May 3), a stop process and a start process (May 17 and May 18), and a normal operation process (monthly from May to August) of the generator 21g. The types of event information X are the total number of occurrences of the top 30 types of warning of the device 21, the total number of occurrences of the top 30 types of start and stop operations of the device 21, the total number of the top 30 types of operation manipulation of the device 21, the total number of adjustment manipulation of the device 21, and the total number of occurrences of system warning that occurred in the operation information analyzer 10. Regarding the warning in the device 21, the total number of occurrences of the top 30 types of warning, the total number of occurrences of the top 30 types of recovery, and the total number of occurrences including other warning than the top 30 types of warning as well are displayed. Regarding the start and stop operations of the device 21, the total number of occurrences of the top 30 types of start and stop operations corresponding to "on", the total number of occurrences of the top 30 types of start and stop operations corresponding to "off", and the total number of occurrences including other start and stop operations than the top 30 types of start and stop operations as well are displayed. Regarding the operation manipulation of the device 21, the total number of the top 30 types of operation manipulation and the total number of occurrences including other operation manipulation than the top 30 types of operation manipulation as well are displayed. Regarding the system warning that occurred in the operation information analyzer 10, the total number of occurrences of warning and the total number of occurrences of recovery are displayed. The field of "remarks" indicates a part of breakdown of items having particularly large total number of occurrences (items with * in FIG. 9). In this manner, the user can easily grasp how frequently the warning, the start and stop operations, the operation manipulation, and the adjustment manipulation of the device 21 and the system warning that occurred in the operation information analyzer 10 occurred each time the operation state (load of generator 21g) of the apparatus 20 changes.

The presentation of information by the information presentation unit 13 is not limited to only the tables described above. In the example of analysis results Z in FIG. 10, the start and stop frequency of a device 21 freely selected by a user in a period of the start process of the generator 21g (the period surrounded by the broken line in FIG. 3) is indicated by a pie chart. In the example of analysis results Z in FIG. 11, the start and stop frequency of a device 21 freely selected by a user in a period of the normal operation process of the generator 21g (the period surrounded by the two-dot chain line in FIG. 3) is indicated by a pie chart. In this manner, by sectioning the period each time the load of the generator 21g changes and presenting the index values of the start and stop frequency of the device 21 in each period by a pie chart, the user can easily grasp the ratio of events that have occurred in the periods.

As described above, in the operation information analyzer 10 in the first embodiment, the information analysis unit 12 generates the databases Y of index values for each period sectioned based on a change in the operation state of the apparatus 20, generates the databases Y of index values while classifying the index values into the event types in the apparatus 20, or generates the databases Y of index values while classifying the index values into types of the devices 21. In this manner, the information presentation unit 13 can present the databases Y of index values to the user as analysis results Z in various forms in an easy-to-understand manner. As a result, the user can evaluate operation conditions and abnormal signs of the apparatus 20 to efficiently find unnecessary operation manipulation and adjustment failure sites in a short period of time, and hence the study on operation improvement of the apparatus 20 and improvement proposal to operators of the apparatus 20 can be more easily conducted.

As described above, the operation information analyzer 10 organizes the event information X on events that have occurred during operation of the apparatus 20 for each period sectioned based on a change in the operation state of the apparatus 20 to generate and store index values used to evaluate operation conditions of the apparatus 20, and presents the stored index values to a user. In this manner, the user can check the index values of the apparatus 20 that are generated and presented while being sectioned each time the operation state of the apparatus 20 changes. Consequently, the operation information analyzer 10 enables the operation conditions of the apparatus 20 to be evaluated more accurately.

Furthermore, the change in the operation state is a change in load of the generator 21g. Consequently, the index value can be more accurately evaluated in accordance with the change in load of the generator 21g. Note that the change in the operation state may be a change in load of any of the devices 21 other than the generator 21g.

The change in the operation state is a change in the type of fuel used in a device 21 (for example, a gas turbine or a steam turbine) for driving the generator 21g. In this manner, the index values can be more accurately evaluated in accordance with the change in the type of fuel used in a device 21 for driving the generator 21g. Note that the change in the operation state may be a change in the type of fuel used in a device 21 other than the device 21 for driving the generator 21g.

The event information X includes information on warning of the apparatus 20, information on manipulation of the device 21, information on an operation state of the device 21, and information on system warning that has occurred in the operation information analyzer 10. The information analysis unit 12 generates index values while classifying the index values into types of event information X, and the information presentation unit 13 presents the index values classified into types of the event information X to a user. In this manner, by presenting the index values to the user while classifying the index values for each event information X related to the apparatus 20, such as warning, manipulation of the device 21, and the operation state of the device 21, the user can easily evaluate the operation conditions of the apparatus 20.

The information analysis unit 12 generates index values while classifying the index values into types of the devices 21, and the information presentation unit 13 presents the index value classified into types of the devices 21 to a user. In this manner, by presenting the index values to the user while classifying the index values for each device 21 included in the apparatus 20, the user can easily evaluate the operation conditions of the apparatus 110.

The information presentation unit 13 presents the index values for each period freely sectioned by the user. Consequently, the index values can be presented only in a period that the user wants to check, and hence the user can easily evaluate the operation conditions of the apparatus 20.

Second Embodiment

Figure 12:
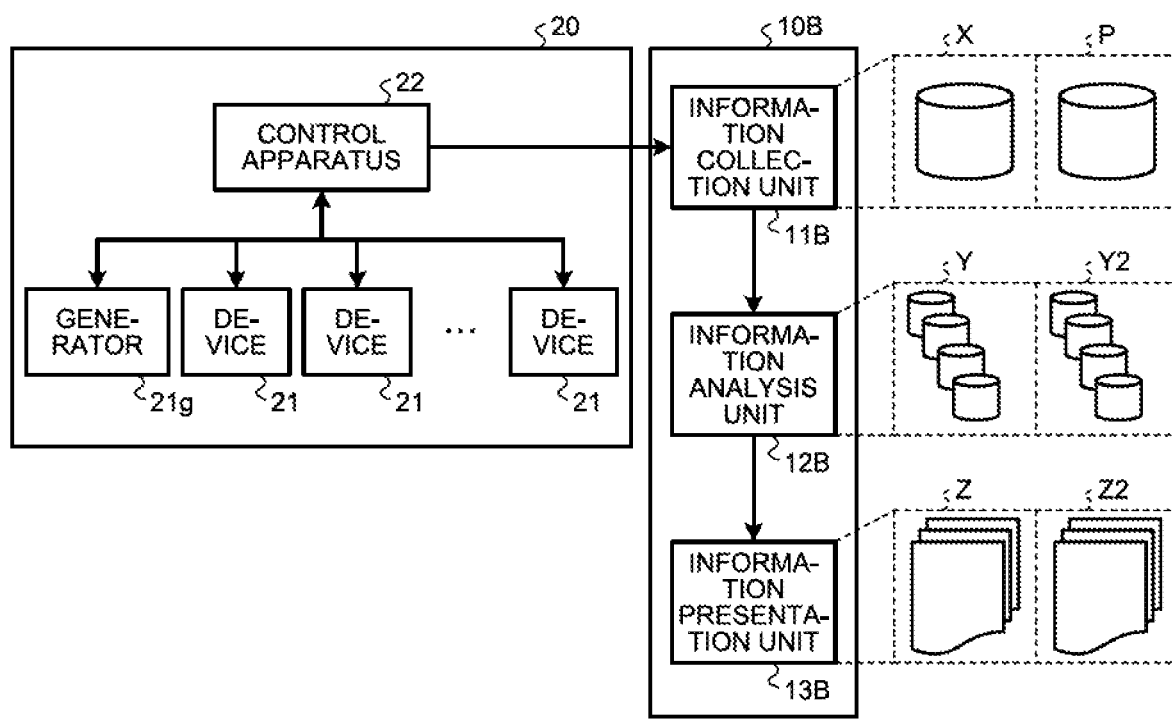
FIG. 12 is a block diagram illustrating an operation information analyzer according to a second embodiment.

Next, an operation information analyzer 10B according to a second embodiment is described. FIG. 12 is a block diagram illustrating the operation information analyzer 10B. The operation information analyzer 10B includes an information collection unit 11B instead of the information collection unit 11 in the operation information analyzer 10 in the first embodiment, an information analysis unit 12B instead of the information analysis unit 12 in the operation information analyzer 10, and an information presentation unit 13B instead of the information presentation unit 13. Note that the functions of the information collection unit 11B, the information analysis unit 12B, and the information presentation unit 13B are the same as those of the information collection unit 11, the information analysis unit 12, and the information presentation unit 13 in the first embodiment except for functions described below, and hence descriptions of the overlapping functions are omitted.

The information collection unit 11B has, in addition to the functions of the information collection unit 11 in the first embodiment, a function of acquiring a process amount P of each device 21 from the control apparatus 22 in the apparatus 20 and transmitting the process amount P to the information analysis unit 12B. Note that the other functions of the information collection unit 11B are the same as those of the information collection unit 11 in the first embodiment, and hence descriptions thereof are omitted.

The information analysis unit 12B has, in addition to the functions of the information analysis unit 12 in the first embodiment, a function of generating and storing databases Y2 in which the above-mentioned event information X and the behavior of process amounts P related to the event information X are associated with each other. Note that the other functions of the information analysis unit 12B are the same as those of the information analysis unit 12 in the first embodiment, and hence descriptions thereof are omitted.

FIG. 13 is an explanation diagram illustrating an example of a correspondence relation between event information X and process amounts P related to the event information X. In the example illustrated in FIG. 13, the field of "event information X" indicates specific contents of the type code, name, and start and stop operations of the device 21, and the field of "related process amount P" indicates specific contents of process amounts P related to the start and stop operations of the device 21 (hereinafter referred to as "related process amounts P"). Note that the event information X is not limited to information on the start and stop operations of the device 21, and may be information on warning that has occurred in each device 21 in the apparatus 20, information on operation states other than the start and stop operations of each device 21 (information indicating that in which operation mode the device 21 is operating), information on operation manipulation of each device 21, and information on adjustment manipulation of each device 21.

In the second embodiment, the correspondence relation between the event information X and the related process amounts P exemplified in FIG. 13 is set by a user in advance and stored in the information analysis unit 12B. Note that the correspondence relation is not necessarily required to be set in advance, and may be generated in the information analysis unit 12B as needed. In this case, the information analysis unit 12B only needs to set, among the process amounts P acquired from the information collection unit 11B, process amounts whose behavior have changed in a predetermined period before and after the event occurrence time as related process amounts P. The information analysis unit 12B generates and stores a database Y2 in which the values of related process amounts P are arranged in time series in accordance with the correspondence relation illustrated in FIG. 13 in a predetermined period before and after the occurrence time of the event information X acquired from the information collection unit 11B.

Similarly to the presentation of the analysis results Z, the information presentation unit 13B presents the database Y2 stored in the information analysis unit 20B in which the event information X and the behavior of the related process amounts P are associated with each other to the user as analysis results Z2. Note that the other functions of the information presentation unit 13B are the same as those of the information presentation unit 13 in the first embodiment, and hence descriptions thereof are omitted.

Figure 14:
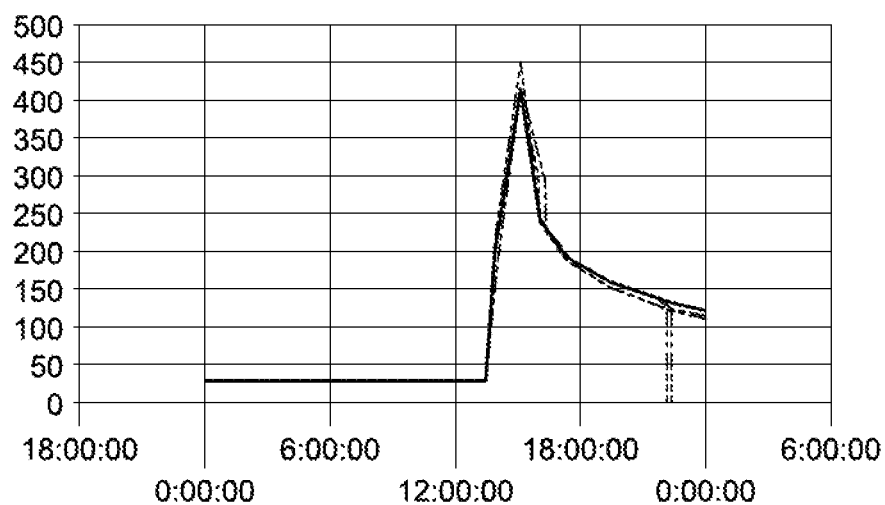
FIG. 14 is an explanation diagram illustrating an example of analysis results of event information and the behavior of related process amounts.

FIG. 14 is an explanation diagram illustrating an example of analysis results Z2 of the event information X and the behavior of the related process amounts P. The example illustrated in FIG. 14 is a line chart indicating the behavior of related process amounts P in a predetermined period before and after timing at which a predetermined event occurred in the apparatus 20. In FIG. 14, the horizontal axis is time, and the vertical axis is the value of the related process amount P. In this manner, the behavior of the process amounts P before and after the occurrence of the event can be easily grasped. Consequently, the user can more efficiently analyze the cause of the occurrence of the event. Specifically, the user can more accurately and finely evaluate the operation conditions and abnormal signs of the apparatus 20, and still more efficiently find unnecessary operation manipulation and adjustment failure sites. Note that the analysis results Z2 are not limited to the line chart, and may be a table in which the values of process amounts P are arranged in time series or a graph in another form.

Third Embodiment

Figure 15:
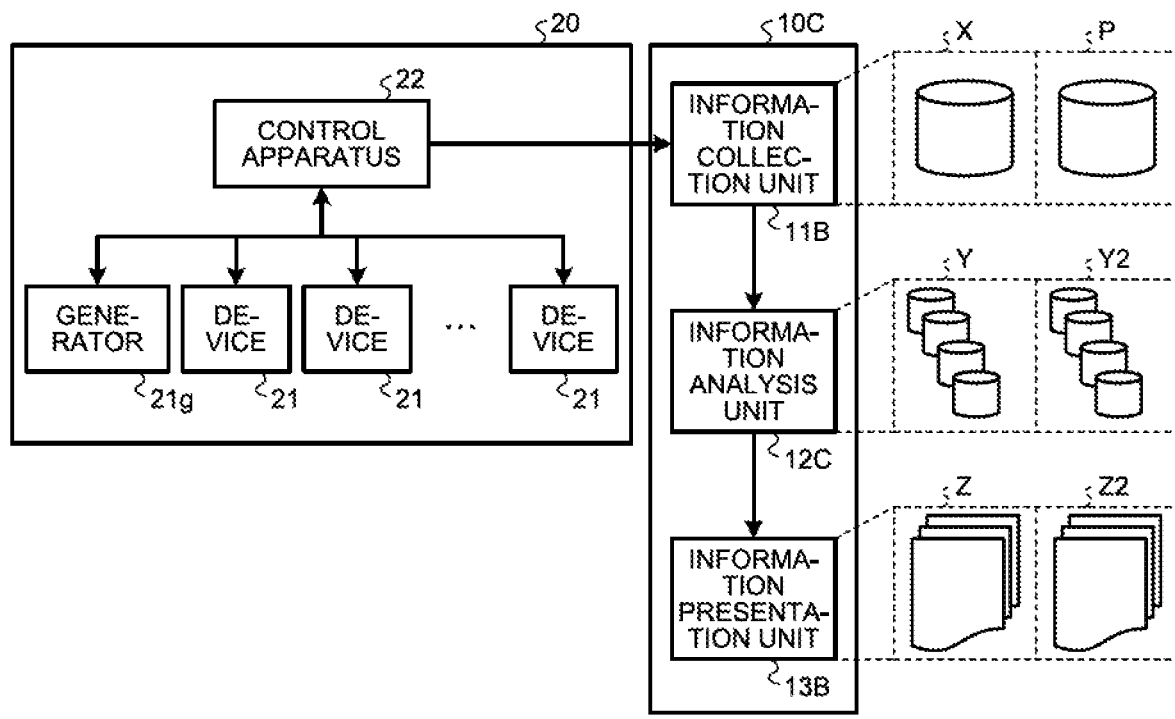
FIG. 15 is a block diagram illustrating an operation information analyzer according to a third embodiment.

Next, an operation information analyzer 10C according to a third embodiment is described. FIG. 15 is a block diagram illustrating the operation information analyzer 10C. The operation information analyzer 10C includes an information analysis unit 12C instead of the information analysis unit 12B in the operation information analyzer 10B in the second embodiment. Note that the other configurations of the operation information analyzer 10C are the same as those of the operation information analyzer 10B, and hence descriptions thereof are omitted. The functions of the information analysis unit 12C are the same as those of the information analysis unit 12B in the second embodiment except for functions described below, and hence descriptions of the overlapping functions are omitted.

When a device 21 is updated or repaired (overhauled), the information analysis unit 12C temporarily stops storing databases Y of index values related to the updated or repaired device 21, and newly generates and stores databases Y of index values. When a device 21 is updated or repaired, the information analysis unit 12C temporarily stops storing the database Y2 related to the updated or repaired device 21 in which the event information X and the behavior of the related process amounts P are associated with each other, and newly generates and stores the database Y2.

In the third embodiment, the database Y of index values related to an updated or repaired device 21 and the database Y2 in which event information X related to an updated or repaired device 21 and the behavior of related process amounts P are associated with each other are set by a user in advance and stored in the information analysis unit 12C. Note that the database Y of index values related to an updated or repaired device 21 and the above-mentioned database Y2 related to an updated or repaired device 21 are not necessarily required to be set in advance, and may be generated in the information analysis unit 12C as needed. In this case, the information analysis unit 12C only needs to set a database Y of index values whose values abruptly change before and after a device 21 is updated or repaired and a database Y2 in which event information X and the behavior of related process amounts P are associated with each other as a database Y and a database Y2 related to the updated or repaired device 21.

In this manner, each time a device 21 is updated or repaired, the database Y of the index values and the database Y2 in which the event information X and the behavior of the related process amounts P are associated with each other can be presented to the user as analysis results Z and analysis results Z2, respectively, in various forms in an easy-to-understand manner. As a result, the user can evaluate operation conditions and abnormal signs of the apparatus 20 to efficiently find unnecessary operation manipulation and adjustment failure sites in a short period of time, and hence the study on operation improvement of the apparatus 20 and improvement proposal to operators of the apparatus 20 can be more easily conducted.

Figure 10:
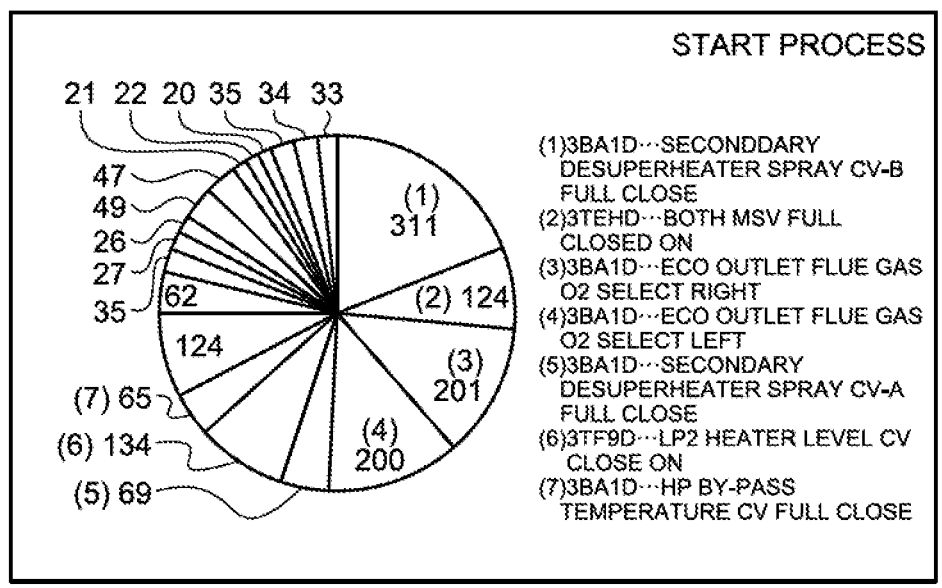
FIG. 10 is an explanation diagram illustrating an example of analysis results presented by the information presentation unit.
Figure 11:
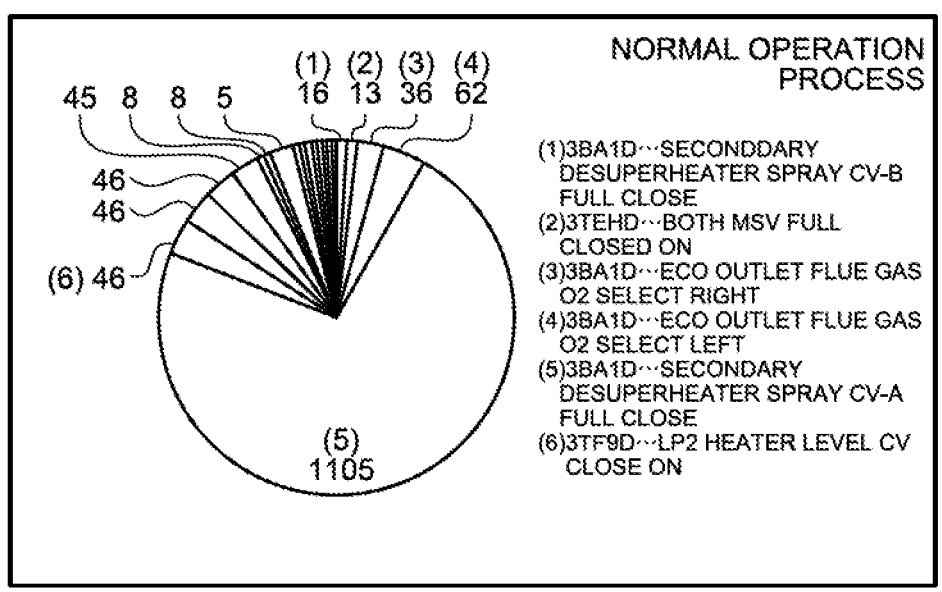
FIG. 11 is an explanation diagram illustrating an example of analysis results presented by the information presentation unit.

A change in index value can be compared before and after a device 21 is updated or repaired. Thus, the comparison of effects indicating how operation conditions of the apparatus 20 are influenced due to the update or repair of the device 21 can be easily made to easily evaluate relative merits before and after the device 21 is updated or repaired. A change in behavior of related process amounts P upon the occurrence of an event can be compared before and after a device 21 is updated or repaired. Thus, the cause of the occurrence of the event can be more efficiently analyzed. Note that, by comparing the occurrence frequency of an event before and after a device 21 is updated or repaired by a pie chart as illustrated in FIG. 10, for example, the change in operation conditions of the apparatus 20 before and after the device 21 is updated or repaired can be presented to the user in a more easy-to-understand manner.

Note that, when a device 21 is updated or repaired (overhauled), the information analysis unit 12C may temporarily stop storing databases Y of index values related to the updated or repaired device 21, and newly generate and store only databases Y of index values. In this case, the information collection unit 11B is not necessarily required to have the function of collecting process amounts P in the apparatus 20, and the information analysis unit 12C is not necessarily required to generate and store databases Y2 in which event information X and the behavior of related process amounts P are associated with each other.

When a device 21 is updated or repaired (overhauled), the information analysis unit 12C may temporarily stop only storing databases Y2 which are related to the updated or repaired device 21 and in which event information X and the behavior of related process amounts P are associated with each other, and newly generate and store only the databases Y2.

REFERENCE SIGNS LIST 10, 10B, 10C Operation information analyzer
11, 11B Information collection unit
12, 12B, 12C Information analysis unit
13, 13B Information presentation unit
20 Apparatus
21 Device
21g Generator
22 Control apparatus
P Process amount
X Event information
Y, Y2 Database
Z, Z2 Analysis result

The invention claimed is:

1. An operation information analyzer, comprising:
an information collection unit configured to collect event information on events that have occurred during operation of an apparatus including a plurality of devices and to collect process amounts of the apparatus, each process amount being a parameter indicating a measured output of the apparatus;
an information analysis unit configured to organize the collected event information to generate and store a first database of index values used to evaluate operation conditions of the apparatus and a second database in which the event information and behavior of the process amount related to the event information are associated with each other; and
an information presentation unit configured to present the database and the data stored in the information analysis unit to a user, wherein
the event information includes information on warning of the apparatus, information on manipulation of the devices, information on an operation state of the devices, and information on warning of the operation information analyzer,
the information analysis unit classifies the event information into types of the event information either for each period freely sectioned by the user or for each period sectioned based on a change in an operation state of the apparatus to generate the first database and the second database,
the information presentation unit presents the first database classified into types of the event information for each period sectioned based on the change in the operation state of the apparatus to the user, and
the information analysis unit sets, as the process amounts, process amounts whose behavior have changed in a predetermined period before and after the occurrence time of a corresponding event among the process amounts acquired from the information collection unit.

2. The operation information analyzer according to claim 1, wherein the change in the operation state is a change in load of any of the devices.

3. The operation information analyzer according to claim 1, wherein the change in the operation state is a change in type of fuel used in any of the devices.

4. The operation information analyzer according to claim 1, wherein the information analysis unit generates and stores the first database while classifying the database into types of the devices, and the information presentation unit presents the first database classified into types of the devices to the user.

5. The operation information analyzer according to claim 1, wherein when any of the devices is updated or repaired, the information analysis unit temporarily stops storing the first database related to the updated or repaired device, and newly generates and stores a first database, and the first database related to the updated or repaired device is a database whose values change before and after the device is updated or repaired.

6. The operation information analyzer according to claim 1, wherein when any of the devices is updated or repaired, the information analysis unit temporarily stops storing the second database related to the updated or repaired device, and newly generates and stores the data, and the second database related to the updated or repaired device is a second database whose value changes before and after the device is updated or repaired.

7. The operation information analyzer according to claim 1, wherein the information analysis unit generates, as the first databases classified into types of the event information for each period sectioned based on the change in the operation state of the apparatus, a database of an occurrence frequency of warning of the operation information analyzer, an order of occurrence of warning and recovery of the operation information analyzer in time series, occurrence intervals of warning of the operation information analyzer, and an occurrence time length of warning of the operation information analyzer.

* * * * *